Feb. 8, 1944.     C. CHEDISTER     2,341,313
CONTINUOUS MOTION PICTURE PROJECTOR
Filed Sept. 9, 1941
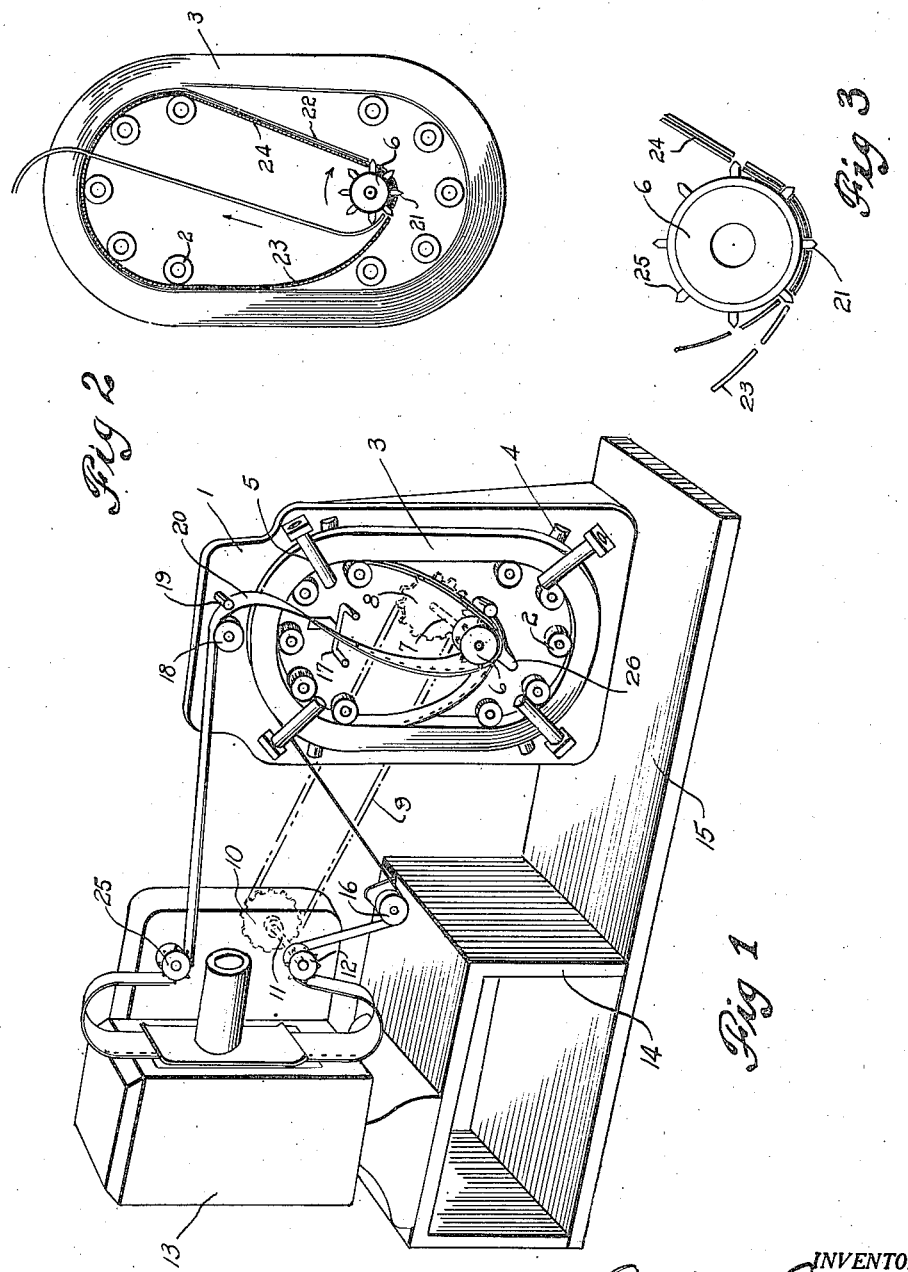
INVENTOR.
Conkling Chedister
BY
Morgan, Finnegan and Durham
ATTORNEYS Patented Feb. 8, 1944

2,341,313

UNITED STATES PATENT OFFICE 2,341,313

CONTINUOUS MOTION PICTURE PROJECTOR

Conkling Chedister, Livingston, N. J.

Application September 9, 1941, Serial No. 410,137

14 Claims. (Cl. 88—18.7)

The invention relates generally to motion picture projection, more especially to film feeding devices for motion picture projectors having an endless film, such as those used for advertising or educational purposes, where it may be required to provide a continuous or endless cycle of projection programs.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompany drawing, referred to herein and constituting a part hereof, illustrates one embodiment of the invention, and together with the description, serve to explain the principles of the invention.

Of the drawing:

Fig. 1 is a perspective of a continuous film magazine embodying the invention, shown assembled as a unit with a projector of conventional type;

Fig. 2 is a detail, in front elevation, showing the continuous film loop; and

Fig. 3 is an enlarged view of the feed sprocket and section of film.

Various means have been developed in the past for feeding a continuous film, but such devices are complicated, require intricate mechanical equipment subject to wear and requiring frequent adjustment, and are usually uncertain in operation and destructive of film.

The object of my invention is to eliminate mechanical parts and provide an endless film-feeding mechanism requiring no adjustment whatever, at the same time providing means for feeding the film positively and in a manner that will subject the film to very little wear on the film perforations. By my invention the life of the film is very greatly prolonged, and stoppage from film breakage or splice separations are substantially eliminated. Moreover the quality of the film is unimpaired after long and continuous use because rubbing and scratching of the surface is greatly reduced.

My invention embodies the novel principle of utilizing a strip of the endless film itself as a driving means for the mass or loop of the film, so that no extraneous friction is imparted to the film and unusual strains and uneven or jerky action cannot occur in the film feed. The driving action takes place between contacting surfaces of the film loop itself so that a minimum of friction occurs and that friction exists between film surfaces which are constantly changing. Hence a positive drive is assured but without imposing undesired stresses and extraneous frictional contacts on the delicate emulsion surfaces of the film. The novel action of my invention thus tends to keep the film in optimum condition and is unaffected by major changes in speed of drive and in the temperature or other working conditions.

It will be understood that the foregoing general description and the following detailed description as well are exemplary and explanatory of the invention but are not restrictive thereof.

Referring now in detail to the present preferred embodiment of the invention illustrated by way of example in the accompanying drawing the main base or support for the endless film is a vertical plate, provided with a plurality of anti-friction rollers 2 arranged in a semi-circular position in the upper and lower sections of the base plate 1, to form an elongated or elliptical loop 3 composed of a plurality of layers of film, preferably provided with the usual sprocket perforations. A plurality of guide rollers 4 and 5 are positioned at the corners of the base against both edges of the film to guide the film loop 3 in position against the face of plate 1, and are preferably free to rotate with the film loop.

As shown projector 13 may be any standard film projector mounted on support 14, fixed to base panel 15 which also provides a base for mounting film plate 1 to combine the projector and film magazine into an integral unit. A conventional film drive on the projector comprises the driven shaft 11 having sprocket 12 for engaging the film after passing through the projector gate. Roller 16 is positioned to guide the film strip from the projector to the outer layer at the top of the film loop 3. Means are provided for feeding the film to the projector from the center of the loop 3 outwardly over its upper section by guide 17 and guide it back to the same plane as film loop 3, by roller 18 and guide 19. The latter may be mounted as a unit and given an angular position to conform with the shape of the film strip as shown at 20.

Means for imparting rotational feeding motion to the loop 3 on its supports comprise sprocket 6 fixed to shaft 7 on base plate 1 by any convenient bearing support, not shown. The teeth 21 of sprocket 6 engage the strip of film as it comes from the inside layer of the loop 3. Chain sprocket 8 is fixed to shaft 7 and driven by chain 9 which in turn is driven by sprocket 10 fixed to shaft 11 of projector sprocket 12, driven in the direction indicated by arrows. Film loop 3, built up of successive layers of film (Fig. 2) feeds out the center over sprocket teeth 21 back into inner layer of loop 3 and over anti-friction rollers 2, as shown at 23, returning to the sprocket as shown by the shaded portion of film strip 24. From sprocket teeth 21 the driven strip 20 then continues upwardly to guide roller 18 (Fig. 1).

Thus the strip of film 23—24 comprises a continuous locked belt (indicated by the shaded portion of the film), which is driven by sprocket 6 at a rate synchronous with sprockets 12 and 25 of projector 13. Said shaded portion 23—24 of film strip 3 thus provides the driving means for the entire mass of film loop 3. The weight of said loop is exerted downward against the driven film belt 23—24 to constitute a frictional drive between each of the layers in the loop. The constant-length film belt 23—24, driven by sprocket 6, drives each successive layer of film lying outwardly from rollers 2 at the same angular speed but due to the increased diameter of each successive outer layer it will drive the next outer adjacent layer at a higher peripheral speed, resulting in a smooth flow of film circulating around the rollers 2.

The load placed upon film perforations at their point of contact at teeth 21 of sprocket 6 and the actual load on sprocket teeth 21 will be governed entirely by the weight of film loop 3 as it rotates on anti-friction rollers 2. With a very long film the film loop 3 might be of sufficient mass to place a substantial load on the film perforations engaged by teeth 21 at sprocket 6. In this instance three or more layers of film may be so arranged in belt fashion to constitute the driving medium for the film loop 3. However, as the number of layers of film passing over sprocket 6 is increased substantially longer teeth 21 will be provided on sprocket 6 to accommodate the total number of superimposed film strips. Fig. 3 illustrates how the teeth 21 of sprocket 6 are preferably formed with straight sides, better to engage the perforations of the film. Film guide shoe 26 in Fig. 1 is provided to keep the film engaged in sprocket teeth 21 of sprocket 6 in the conventional manner.

The invention in its broader aspects is not limited to the specific mechanisms shown and described but departures may be made therefrom within the scope of the accompanying claims without departing from the principles of the invention and without sacrificing its chief advantages.

What I claim is:

1. A mechanism for feeding an endless film for a projector or the like including in combination means for rotatably supporting a film loop composed of a plurality of layers of an endless film, means for paying out film from the inside layer of said loop and means for returning film to the outside layer thereof, sprocket means for positively driving a locked, constant-length loop of the film and means for frictionally imparting driving motion from said driven loop to the film loop as the sole means to rotate said film loop on its support.

2. A mechanism for feeding an endless film for a projector or the like including in combination means for rotatably supporting a film loop composed of a plurality of layers of an endless film, means for paying out film from said loop and means for returning film thereto, means for positively driving a constant-length locked loop of the film, means for supporting the weight of said loop on said driven strip, and means for frictionally imparting driving motion from said locked loop to the film loop to rotate said film loop on its support.

3. A mechanism for feeding an endless film for a projector or the like including in combination means for rotatably supporting a film loop composed of a plurality of layers of an endless film, means for paying out film from said loop and means for returning film thereto, driving means within the loop, means for forming a belt of film of constant length locked to and driven by said driving means, and means for imparting driving motion from said belt to the film loop to rotate same on its support.

4. A mechanism for feeding an endless film for a projector or the like including in combination means for rotatably supporting a film loop composed of a plurality of layers of an endless film, means for paying out film from the inside layer of said loop and means for returning film to the outside layer thereof, driving means mounted interiorly of the film loop and engaging a strip of film from the inner layer of the loop at two points to form a locked belt of film of constant length, the film loop having frictional engagement with said driven belt of film to be rotated thereby on the loop support.

5. A mechanism for feeding an endless film for a projector or the like including in combination means for rotatably supporting a film loop composed of a plurality of layers of an endless film, means for paying out film from the inside layer of said loop and means for returning film to the outside layer thereof, driving means mounted interiorly of the film loop and engaging a strip of film from the inner layer of the loop at two overlapping points to form a locked belt of film of constant length, the film loop supporting the weight of and having frictional engagement with said driven belt of film to be rotated thereby on the loop support.

6. A mechanism for feeding an endless film for a projector or the like including in combination means for rotatably supporting a film loop composed of a plurality of layers of an endless film, means for paying out film from the inside layer of said loop and means for returning film to the ouside layer thereof, driving means mounted interiorly of the film loop and engaging a strip of film from the inner layer of the loop at least at two points to form a locked belt of film of constant length, the film loop supporting the weight of and having frictional engagement with said driven belt of film at a locus remote from its engagement with said driving means whereby said loop is rotated thereby on the loop support.

7. A mechanism for feeding an endless film for a projector or the like including in combination means for rotatably supporting a film loop composed of a plurality of layers of an endless film, means for paying out film from the inside layer of said loop and means for returning film to the outside layer thereof, driving means mounted interiorly of the film loop and engaging a strip of film from the inner layer of the loop at least at two overlapping points to form a locked belt of film of constant length, the film loop having frictional engagement with said driven belt of film to be rotated thereby on the loop support.

8. A mechanism for feeding an endless film for a projector or the like including in combination means for rotatably supporting a film loop composed of a plurality of layers of an endless perforated film, means for paying out film from the inside layer of said loop and means for returning film to the outside layer thereof, a driving sprocket mounted interiorly of the film loop and engaging perforations in a strip of film from the inner layer of the loop at two points to form a locked belt of film of constant length, the film loop having frictional engagement with said driven belt of film to be rotated thereby on the loop support.

9. A mechanism for feeding an endless film for a projector or the like including in combination means for rotatably supporting a film loop composed of a plurality of layers of an endless film, means for paying out film from the inside layer of said loop and means for returning film to the outside layer thereof, driving means mounted interiorly of the film loop and out of contact therewith and engaging a strip of film from the inner layer of the loop at two points to form a locked belt of film of constant length, said locked belt of film running between the loop supports and the remaining layers of the loop thereby to impart frictional rotational movement to the outer layers of said loop.

10. A mechanism for feeding an endless film for a projector or the like including in combination means for rotatably supporting a film loop composed of a plurality of layers of an endless film, means for paying out film from the inside layer of said loop and means for returning film to the outside layer thereof, driving means mounted interiorly of the film loop and out of contact therewith and engaging a strip of film from the inner layer of the loop at two points to form a locked belt of film of constant length, said locked belt of film underlying the outer layers of the film loop to impart frictional rotational movement to said loop on its support.

11. A mechanism for feeding an endless film for a projector or the like including in combination means for rotatably supporting a film loop composed of a plurality of layers of an endless film, means for paying out film from the inside layer of said loop and means for returning film to the outside layer thereof, driving means mounted interiorly of the film loop and engaging a strip of film from the inner layer of the loop at two points to form a locked belt of film of constant length, said locked belt of film underlying the outer layers of the film loop at the upper end thereof to impart frictional rotational movement to said loop on its supports.

12. A mechanism for feeding an endless film for a projector or the like including in combination a motion-picture projector having film driving means, means for rotatably supporting a film loop composed of a plurality of layers of an endless film, means for guiding film from said loop to the projector driving means and for returning film therefrom to the loop, driving means within the loop, means for forming a belt of film of constant length locked to and driven by said driving means, and means for imparting driving motion from said belt to the film loop to rotate same on its support.

13. A mechanism for feeding an endless film for a projector or the like including in combination a motion-picture projector having film driving means, means for rotatably supporting a film loop composed of a plurality of layers of an endless film, means for guiding film from said loop to the projector driving means and for returning film therefrom to the loop, driving means within the loop and out of contact therewith, means for forming a belt of film of constant length locked to and driven by said driving means, and means for imparting driving motion from said belt to the film loop to rotate same on its support, said belt-driving means being synchronized with the projector driving means.

14. A mechanism for feeding an endless film for a projector or the like including in combination means for rotatably supporting a film loop composed of a plurality of layers of an endless perforated film, means for paying out film from the inside layer of said loop and means for returning film to the outside layer thereof, a driving sprocket mounted interiorly of the film loop and engaging perforations in a strip of film from the inner layer of the loop at two points to form a locked belt of film of constant length, the teeth of said spocket passing through at least two superposed thicknesses of the film forming said belt, the film loop having frictional engagement with said driven belt of film to be rotated thereby on the loop support.

CONKLING CHEDISTER.